United States Patent
Liu et al.

(10) Patent No.: US 8,504,965 B2
(45) Date of Patent: Aug. 6, 2013

(54) METHOD FOR NON-SHRINKABLE IP INTEGRATION

(75) Inventors: Hung-Yi Liu, Pingzhen (TW);
Chung-Hsing Wang, Baoshan Township (TW); Yung-Chin Hou, Taipei (TW);
Lie-Szu Juang, Saratoga, CA (US)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 222 days.

(21) Appl. No.: 12/895,264

(22) Filed: Sep. 30, 2010

(65) Prior Publication Data
US 2012/0084745 A1    Apr. 5, 2012

(51) Int. Cl.
*G06F 17/50*    (2006.01)
(52) U.S. Cl.
USPC ............ 716/119; 716/110; 716/111; 716/118
(58) Field of Classification Search
USPC .......................................................... 716/119
See application file for complete search history.

(56) References Cited

U.S. PATENT DOCUMENTS

| | | | | |
|---|---|---|---|---|
| 6,756,242 B1* | 6/2004 | Regan | ............................. | 438/14 |
| 7,640,520 B2* | 12/2009 | Wang et al. | ................... | 716/132 |
| 7,783,995 B2* | 8/2010 | Joshi | ............................ | 716/103 |
| 2009/0326873 A1 | 12/2009 | Wang et al. | | |

* cited by examiner

*Primary Examiner* — Jack Chiang
*Assistant Examiner* — Eric Lee
(74) *Attorney, Agent, or Firm* — Slater & Matsil, L.L.P.

(57) ABSTRACT

A method of designing integrated circuits includes providing a design of an integrated circuit at a first scale, wherein the integrated circuit includes a shrinkable circuit including a first intellectual property (IP); and a non-shrinkable circuit including a second IP having a hierarchical structure. A marker layer is formed to cover the non-shrinkable circuit, wherein the shrinkable circuit is not covered by the marker layer. The electrical performance of the non-shrinkable circuit is simulated using a simulation tool, wherein the simulated non-shrinkable circuit is at a second scale smaller than the first scale.

20 Claims, 3 Drawing Sheets

METHOD FOR NON-SHRINKABLE IP INTEGRATION

CONVENTIONAL TEACHING

In order to incorporate more functions and achieve better performance and less cost, integrated circuits are formed with increasingly smaller dimensions. However, there are legacy circuits that have already been designed with greater dimensions. It is not cost effective to redesign these circuits for smaller dimensions, and these circuits were typically shrunk before they are implemented on silicon wafers. Conventionally, foundries performed the task of shrinking integrated circuits.

Since the performances of integrated circuits are often related to their sizes, some integrated circuits are preferably not shrunk. For example, analog circuits and some high-speed integrated circuits need to keep their original sizes in order to maintain their performance unchanged throughout different generations of integrated circuits. This creates a dilemma. Since these non-shrinkable integrated circuits are often integrated in the same semiconductor chips with shrinkable integrated circuits, whose performances are generally not affected by their dimensions, the integrated circuits for a semiconductor chip cannot be uniformly shrunk, and efforts are needed to shrink only the shrinkable circuits, while keeping the non-shrinkable circuits intact.

To achieve this goal, typically, the graphic data system (GDS or GDSII format) layout of the non-shrinkable circuits was blown up (magnified) first. An abstract/phantom is then generated from the blown-up GDS layout of the non-shrinkable circuits. The blown-up GDS layout and the respective abstract are then merged with the GDS layout and the abstract of shrinkable circuit layouts to generate a new integrated circuit design. Foundries can then shrink the new integrated circuit to substantially a same scale as before the GDS layout of the non-shrinkable circuit was magnified. Accordingly, the GDS layout of the non-shrinkable circuits is restored back to the original size, while the shrinkable circuits are shrunk.

The conventional methods for shrinking integrated circuits suffer from drawbacks, however. First, even if the non-shrinkable circuits are magnified and then shrunk in a same scale, the resulting dimensions and locations of the final circuits may not be exactly the same as in the original design. This is due to the snapping of integrated circuits to grids, which causes the change in the sizes and/or locations of integrated circuit components, and sometimes broken lines. The change in dimensions may cause performance drift. Second, GDS files are typically hierarchical with a plurality of levels. In order to avoid the adverse generation of broken lines caused by snapping, the hierarchy of GDS files needs to be flattened into a same level, resulting in a big GDS file. This causes the handling time, such as the post-layout simulation time, to be significantly increased.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

Figure 1:
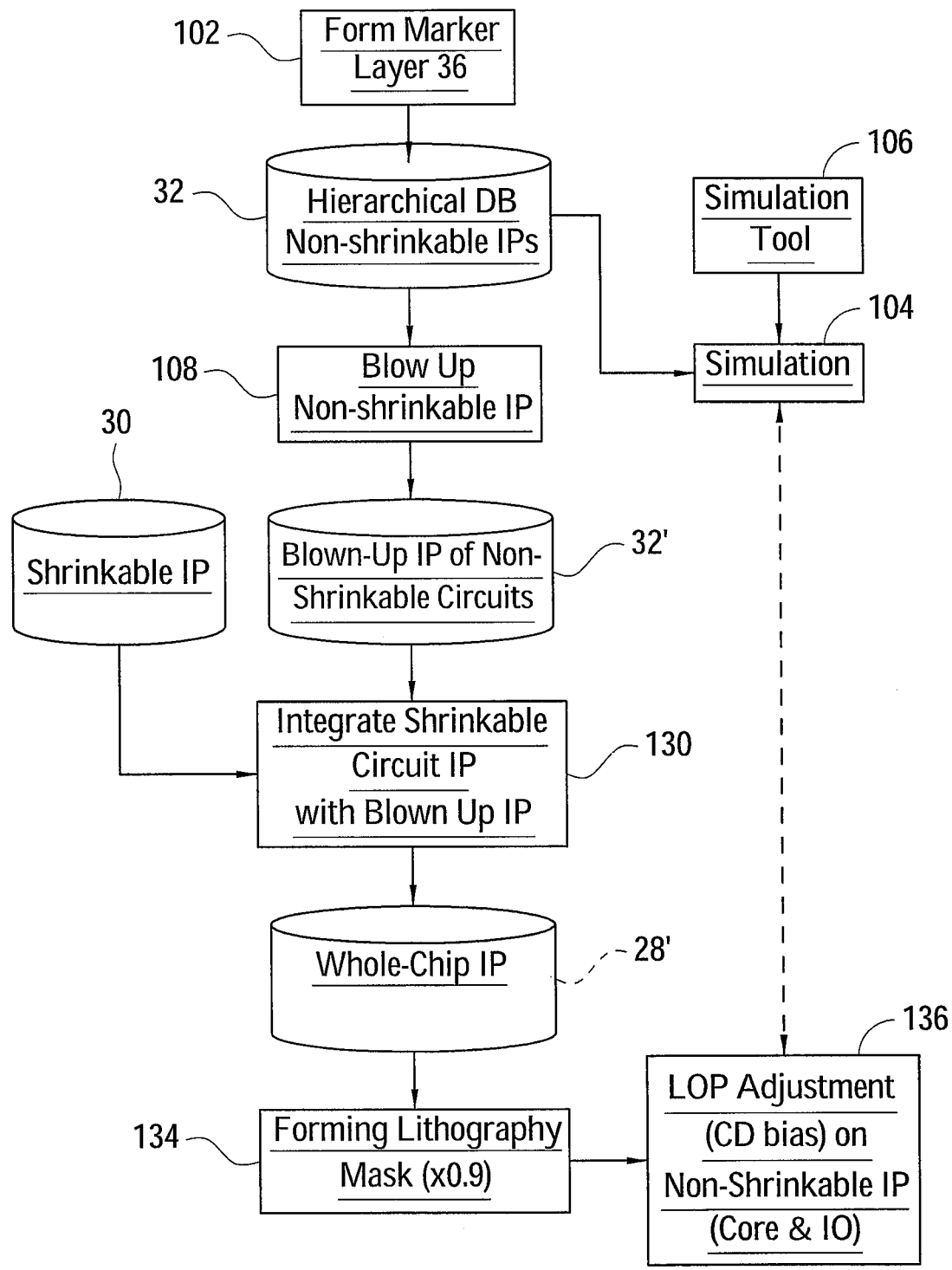
FIG. 1 illustrates a work flow in accordance with an embodiment.
Figure 2:
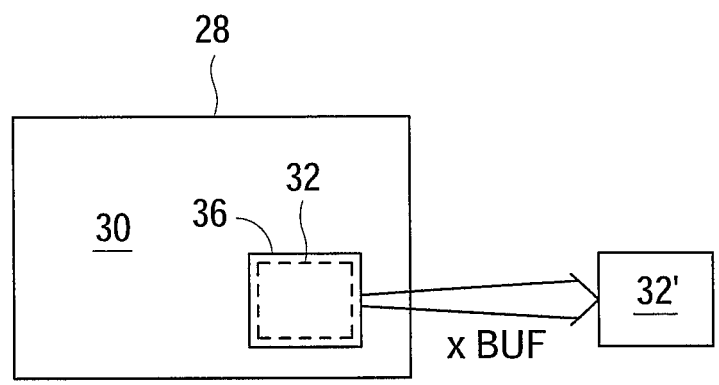
FIG. 2 illustrates a chip representation, wherein a non-shrinkable IP in the chip representation is blown up.
Figure 3:
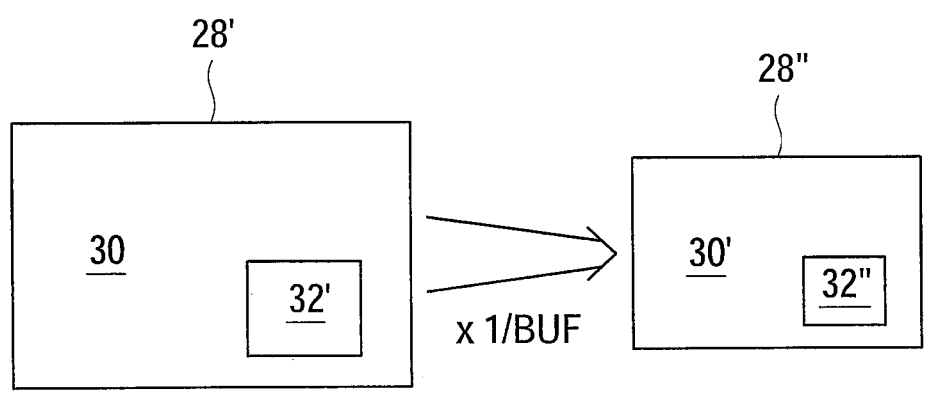
FIG. 3 illustrates the shrinking of a chip representation.

FIGS. 1 through 3 illustrate the process for shrinking an integrated circuit design (layouts) in accordance with an embodiment, in which integrated circuits designed at a first scale (referred to as a full-node scale) is shrunk to a reduced scale. In the following exemplary embodiments, the full-node scale is 45 nm scale, in which integrated circuits are formed using a full-node technology (for example, 45 nm technology), while the reduced scale is 40 nm scale, in which integrated circuits are formed using a reduced-scale technology (for example, 40 nm technology). It is noted that the 45 nm scale and 40 nm scale are merely examples, and the teaching of the embodiments may be used for the shrinking of integrated circuits between any two technology generations. Since half nodes are involved, for simplicity, the embodiments recite the scale of 10/9 as a blow-up factor (BUF) for blowing-up layouts, and 0.9 as the shrinking factor for shrinking layouts from 45 nm technology to 40 nm technology. Throughout the various views and illustrative embodiments, like reference numbers are used to designate like elements.

FIG. 1 illustrates a flow chart. The steps recited in the flow chart may be understood referring to FIGS. 2 and 3. FIG. 2 schematically illustrates chip representation 28, wherein the integrated circuits in chip representation 28 are at the full-node scale (such as 45 nm scale). Chip representation 28 is not a physical chip, but represents the design of physical chip that is to be manufactured. Similarly, the term "integrated circuit (s)" or "circuits" in chip representation 28 refers to the design of the integrated circuit(s), rather than physical integrated circuits formed on wafers/chips. Chip representation 28 includes a shrinkable circuit layout and a non-shrinkable circuit layout, which are also referred to as intellectual properties (IPs) of the respective circuits. The IP of the shrinkable circuit(s) is referred to as shrinkable IP 30 (also refer to FIG. 1), and the IP of the non-shrinkable circuit(s) is referred to as non-shrinkable IP 32. The IPs including shrinkable IP 30 and non-shrinkable IP 32 may be represented using graphic data system (GDS) files. Chip representation 28 may include a plurality of shrinkable integrated circuits and a plurality of non-shrinkable integrated circuits, and the teaching regarding shrinkable IP 30 and non-shrinkable IP 32 is equally applicable to other shrinkable and non-shrinkable circuits.

The non-shrinkable circuit with non-shrinkable IP 32 may include analog circuits, input/output (JO) circuits, and/or high-speed digital circuits, or any other circuits that are not to be shrunk when the integrated circuits are to be manufactured using the reduced-scale technology. Non-shrinkable circuits are also alternatively referred to as legacy circuits or critical circuits. The shrinkable circuits with shrinkable IP 30 may include digital circuits.

Figure 5:
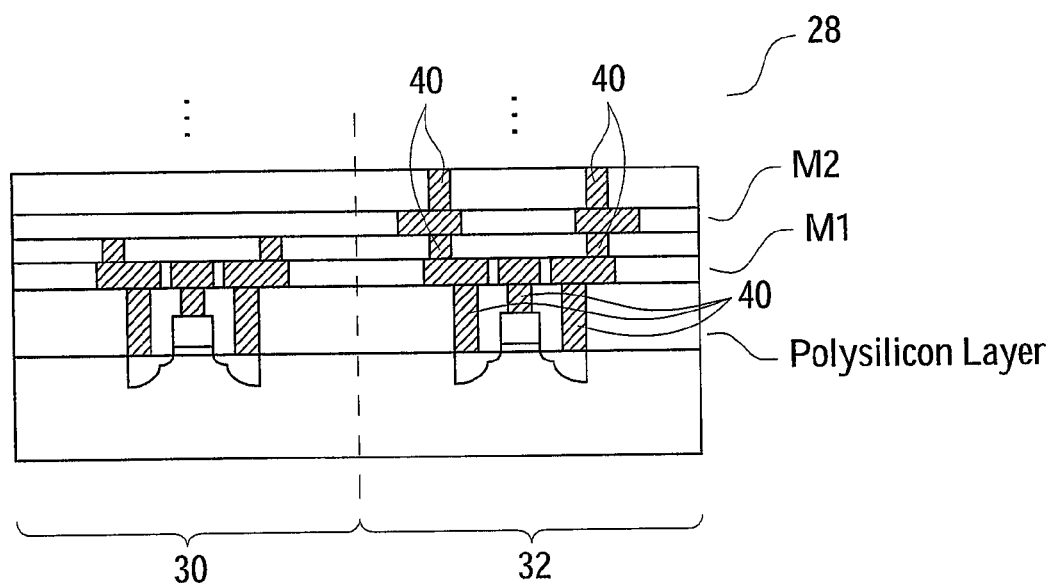
FIG. 5 illustrates a schematic chip representation including a hierarchical structure.

Referring back to FIG. 1, chip representation 28, which includes shrinkable IP 30 and non-shrinkable IP 32, is provided. Shrinkable IP 30 has a hierarchical, and may be saved in a hierarchical database, which is further stored in a storage media such as a hard drive. An exemplary hierarchical structure of chip representation 28 is schematically shown in FIG. 5, wherein each of IPs 30 and 32 includes a plurality of hierarchical layers including metal layers M1, M2, a polysilicon layer, and the like. In step 102 as shown in FIG. 1, marker layer 36 (referring to FIG. 2) is formed to cover non-shrinkable IP 32 (and all other non-shrinkable IP in chip representation 28), while no shrinkable IP 30 in chip representation 28 is covered by marker layer 36. It is noted that although in FIG. 2, marker layer 36 is shown as being slightly greater than non-shrinkable IP 32, it may actually overlap non-shrinkable IP 32 accurately. Marker layer 36 is a virtual layer that is used in the processing of IP/layouts, and is not manufactured on any lithography masks and on physical wafers.

A simulation (step 104) is then performed using simulation tool 106, which may include a computer hardware, to simulate the performance of the non-shrinkable circuit (represented by non-shrinkable IP 32" in FIG. 3) in the resulting reduced-scale node (such as in 40 nm node). In other words, in the exemplary embodiment, the simulation may simulate the electrical performance of the non-shrinkable circuit manufactured using the 40 nm technology. Accordingly, the simulation is a post-layout simulation. In the simulation, a resistance-capacitance (RC) mode extraction is performed, which may use resistance-capacitance (RC) and/or layout parasitic extraction (LPE) decks (command files, or scripts). It is expected that although the design of integrated circuits is scaled down from the full-node scale to the reduced scale, the non-shrinkable circuits will maintain the same lateral size. However, the chips formed using the full-node technology and the reduced-scale technology will have different vertical sizes (such as the thickness of metal lines), which vertical sizes will not be shown in the layouts (such as IPs 30 and 32). The change in the vertical size will also impact the circuit performance, such as timing, power, RC delay, and the like. To ensure that the circuit performance of the non-shrinkable circuit formed using the reduced-scale technology matches the performance of the non-shrinkable circuit formed using the full-node technology as much as possible, the foundry for manufacturing the lithography mask (step 134) needs to slightly adjust some sizes, such as the critical dimensions (widths of poly gates, gate lengths, or the like), of the non-shrinkable circuit (non-shrinkable IP 32" as in FIG. 3) to compensate for the performance deviation. The adjustment to the critical dimensions is referred to as CD bias hereinafter. On the other hand, the critical dimensions of the shrinkable circuits (non-shrinkable IP 30' in FIG. 3) may not be adjusted. In the simulation, the adjusted dimensions incorporating the CD bias are used in the simulation step 104, which means that the simulation is performed on the non-shrinkable circuit with the critical dimensions already adjusted. Accordingly, the simulation may provide accurate performance information of the resulting circuits formed using the reduced-scale technology.

Next, as shown in step 108, non-shrinkable IP 32 (FIGS. 1 and 2) are blown-up by the blow-up factor BUF (for example, 10/9). As a result, a blown-up IP (which may be in a GDS format) 32' (FIGS. 1 and 2) is generated. During the blown up, the hierarchical structure of non-shrinkable IP 32 is flattened into one layer, and the resulting features such as polygons in each of the layers are snapped to a new manufacturing grid, such as a 1 nm grid. It is realized that although the resulting blown-up IP 32' is flattened, since the post-layout simulation has already been performed in step 104 and does not need to be run on the blown-up IP 32', the flattening of the hierarchical structure of non-shrinkable IP 32 will not affect the time needed for post-layout simulation.

Referring to step 130 in FIG. 1, shrinkable IP 30 and blown-up IP 32' are integrated to form a whole-chip IP, which is shown as chip representation 28' in FIG. 3. Again, whole-chip IP 28' may be stored in a storage media such as a hard drive, and may be shipped for manufacturing lithography masks. The lithography masks may include transparent portions allowing light that is used for exposing photo resists to pass, and opaque portions for blocking the light. The manufacturing of the lithography masks (also represented by IP 28" in FIG. 3) may be performed by a foundry. During the manufacturing of the lithography masks, the whole-chip IP 28' is shrunk using an optical method, wherein the shrinking is performed using a shrinking factor equal to 1/BUF, with BUF being the blow-up factor used in step 108. In the exemplary embodiment, the whole-chip IP 28' is shrunk with the shrinking factor being equal to 0.9. The resulting lithography masks are shown as 28" in FIG. 3, wherein the scale of 28" is equal to the scale of whole-chip IP 28' times 1/BUF. It is noted that in the resulting circuit design as in lithography masks 28", non-shrinkable IP 32" is restored to the original size of non-shrinkable IP 32', except the possible CD bias may be performed on the critical dimensions of features in non-shrinkable IP 32". The size of shrinkable IP 30' is shrunk to 1/BUF of the size of IP 30.

Before the manufacturing of lithography masks 28", the CD bias may be performed (step 136 in FIG. 1) on the non-shrinkable circuits (IP 32") through logic operations (LOP), so that sizes such as the critical dimensions of features in non-shrinkable IP 32" may be slightly adjusted. During the logic operations, marker layer 36 as shown in FIG. 2 is identified, and the circuits covered by marker layer 36 are identified as non-shrinkable circuits, on which the logic operations may be performed. Conversely, the circuits not covered by marker layer 36 are identified as shrinkable circuits, and no logic operations will be performed on these circuits. As a result, the effect of change in the vertical size from the full-node technology to the reduced-scale technology is compensated for, and the performance of the non-shrinkable circuits manufactured using the reduced-scale technology will match that manufactured using the full-node technology. It is appreciated that in the simulation step 104 in FIG. 1, the CD bias as performed in step 136 has been taken into account. Accordingly, the simulation results are expected to match the performance of the chips formed using lithography masks 28".

In blow up step 108 (FIG. 1), the sizes of contact and/or via sizes (referred to as Co/Vias hereinafter, shown as 40 in FIG. 5) of non-shrinkable IP 32 are also blown up. However, in lithography masks 28" as shown in FIG. 3, the Co/Via sizes of non-shrinkable IP 32" need to be the same as the respective Co/Via sizes of shrinkable IP 30'. Accordingly, the Co/Via sizes of blown-up IP 32' need to be reduced again before integration step 130 (FIG. 1) is performed. Conventionally, the reduction of sizes of the Co/Vias in blown up IP 32' were performed by directly shrinking the sizes of Co/Via sizes in blown-up IP 32'. For example, conventionally, the blown-up Co/Vias were shrunk using the center of the Co/Vias as origins, and each of the Co/Vias was shrunk toward the respective centers, and is then snapped to manufacturing grids. This, however, may cause the mismatch between the sizes of contacts and vias in the non-shrinkable circuits and the sizes of contacts and vias in the shrinkable circuits. The locations of the contacts and vias may also change undesirably.

Figure 4:
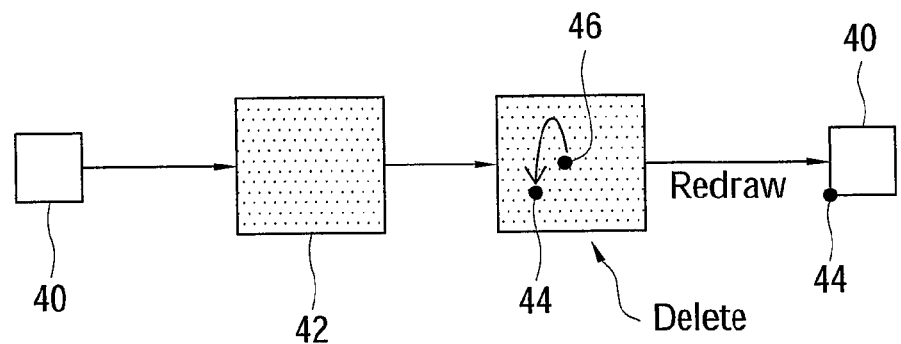
FIG. 4 illustrates the relocation of contacts and vias in the non-shrinkable IP.

In the embodiments, a Co/Via relocation, rather than shrinking, is performed to the contacts and via in blown-up IP 32' (FIGS. 1 and 2). Referring to FIG. 4, after the blow up of Co/Via 40 in step 108 in FIG. 1, the blown-up Co/Via 42 is generated in blown-up IP 32'. Next, the desired location(s) 44 of Co/Vias in blown-up IP 32' is calculated. Please note that locations 44 may be different from center(s) 46 of blown-up Co/Vias 42. Next, blown-up Co/Vias 42 are deleted from blown-up IP 32' as in FIG. 2, and Co/Vias 40 are redrawn in blown-up IP 32' at position 44. Since the redrawn Co/Vias 40 are redrawn in blown-up IP 32' to have exactly the same size as in non-shrinkable IP 32 (FIG. 2), it is equivalent to the relocation of the original Co/Vias 40 in non-shrinkable IP 32 (FIG. 2) to the new locations in blown-up IP 32'. The steps shown in FIG. 4 are also parts of step 108 in FIG. 1. The method of relocating Co/Vias 40 ensures that their sizes and locations may be accurately reproduced without being affected by the blow-up factor BUF. Accordingly, in the embodiments, it is possible to use any blow-up factor BUF. In the exemplary embodiments, the blow-up factor BUF may be set to 1.11, 1.111, or values with more digits and are closer to 10/9 than 1.111. Accordingly, in the embodiments, the size mismatch and location mismatch between the contacts and vias in shrinkable circuits and contacts/vias in non-shrinkable circuits is essentially eliminated.

In the embodiments, simulations may be performed to the original hierarchical structures of non-shrinkable IPs, this results in the reduction in the time needed for the post-layout simulations. Further, by using the Co/Via relocation method, the sizes and locations of Co/Vias in the reduced-scale technology may match that in the full-node technology accurately.

In accordance with embodiments, a method of designing integrated circuits includes providing a design of an integrated circuit at a first scale, wherein the integrated circuit includes a shrinkable circuit including a first intellectual property (IP); and a non-shrinkable circuit including a second IP having a hierarchical structure. A marker layer is formed to cover the non-shrinkable circuit, wherein the shrinkable circuit is not covered by the marker layer. The electrical performance of the non-shrinkable circuit is simulated using a simulation tool, wherein the simulated non-shrinkable circuit is at a second scale smaller than the first scale.

In accordance with other embodiments, a method of designing integrated circuits includes providing a design of an integrated circuit at a first scale, wherein the integrated circuit includes a shrinkable circuit including a first intellectual property (IP); and a non-shrinkable circuit including a second IP having a hierarchical structure. The second IP is blown up by a blow-up factor to generate a blown-up IP. The blown-up IP is then integrated with the first IP to generate a whole-chip IP. The electrical performance of the non-shrinkable circuit is simulated using a simulation tool, wherein the simulated non-shrinkable circuit is at a second scale smaller than the first scale, and wherein the blow-up factor is equal to a ratio of the first scale to the second scale.

In accordance with yet embodiments, a method of designing integrated circuits includes providing a design of an integrated circuit at a first scale, wherein the integrated circuit includes a shrinkable circuit including a first intellectual property (IP); and a non-shrinkable circuit including a second IP having a hierarchical structure. The second IP is blown up by a blow-up factor to generate a blown-up IP, which includes blowing up contacts/vias in the second IP by the blow-up factor to generate blown-up contacts/vias. New locations of the contacts/vias in the blown-up IP is recalculated. The blown-up contacts/vias are deleted from the blown-up IP. The contacts/vias are redrawn in the blown-up IP, with the redrawn contacts/vias having same sizes as the contacts/vias in the second IP.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A method comprising:
providing a design of an integrated circuit at a first scale, wherein the integrated circuit comprises:
a shrinkable circuit comprising a first intellectual property (IP), wherein the first IP comprises layouts of the shrinkable circuit; and
a non-shrinkable circuit comprising a second IP having a hierarchical structure, wherein the second IP comprises layouts of the non-shrinkable circuit;
forming a marker layer to cover the non-shrinkable circuit, wherein the shrinkable circuit is not covered by the marker layer; and
simulating electrical performance of the non-shrinkable circuit having the hierarchical structure using a simulation tool, wherein in the step of simulating, the simulated non-shrinkable circuit has layouts at the first scale and vertical sizes corresponding to a technology-node at a second scale smaller than the first scale, wherein the step of simulating is performed by using a computer.

2. The method of claim 1 further comprising:
blowing up the second IP by a blow-up factor to generate a blown-up IP; and
integrating the blown-up IP with the first IP to generate a third IP.

3. The method of claim 2 further comprising:
shrinking the third IP by a shrinking factor being an inverse of the blow-up factor; and
forming a lithography mask having patterns of the third IP after it is shrunk.

4. The method of claim 3 further comprising:
identifying the non-shrinkable circuit from the third IP through identifying the marker layer; and
before the step of forming the lithography mask, performing a logic operation to apply an adjustment to critical dimensions of features of the non-shrinkable circuit.

5. The method of claim 4, wherein the step of simulation is performed to the non-shrinkable circuit with the adjustment applied.

6. The method of claim 3, wherein the step of shrinking the third IP is performed using an optical method.

7. The method of claim 2, wherein the blow-up factor is equal to a ratio of the first scale to the second scale.

8. The method of claim 7, wherein the step of blowing up the second IP comprises:

blowing up contacts/vias in the second IP by the blow-up factor to generate blown-up contacts/vias;
recalculating new locations of the contacts/vias in the blown-up IP;
deleting the blown-up contacts/vias from the blown-up IP; and
redrawing the contacts/vias in the blown-up IP, with the redrawn contacts/vias having same sizes as the contacts/vias in the second IP.

9. The method of claim 2, wherein in the blown-up IP, the hierarchical structure of the non-shrinkable circuit is flattened.

10. A method comprising:
providing a design of an integrated circuit at a first scale, wherein the integrated circuit comprises:
a shrinkable circuit comprising a first intellectual property (IP), wherein the first IP comprises layouts of the shrinkable circuit; and
a non-shrinkable circuit comprising a second IP having a hierarchical structure, wherein the second IP comprises layouts of the non-shrinkable circuit;
generating a marker layer to cover the non-shrinkable circuit, wherein the shrinkable circuit is not covered by the marker layer;
identifying the non-shrinkable circuit by identifying circuits covered by the marker layer;
blowing up the second IP by a blow-up factor to generate a blown-up IP, wherein the step of blowing up the second IP is performed by using a computer;
integrating the blown-up IP with the first IP to generate a whole-chip IP; and
simulating electrical performance of the non-shrinkable circuit having a hierarchical structure using a simulation tool, wherein in the step of simulating, the simulated non-shrinkable circuit has layouts at the first scale and vertical sizes corresponding to a technology-node at a second scale smaller than the first scale, and wherein the blow-up factor is equal to a ratio of the first scale to the second scale.

11. The method of claim 10 further comprising:
performing a logic operation to apply an adjustment to critical dimensions of features of the non-shrinkable circuit; and
after the step of performing the logic operation, forming a lithography mask from the whole-chip IP, wherein the adjustment to the critical dimensions is incorporated in the lithography mask.

12. The method of claim 11, wherein in the step of simulating the electrical performance of the non-shrinkable circuit, the adjustment is applied to the simulated non-shrinkable circuit.

13. The method of claim 11, wherein the critical dimensions of the features are selected from the group consisting essentially of gate lengths of transistors in the non-shrinkable circuit, gate widths of the transistors in the non-shrinkable circuit, and combination thereof.

14. The method of claim 11, wherein no logic operation is performed to critical dimensions of features of the shrinkable circuit.

15. The method of claim 11, wherein the step of forming the lithography mask comprises shrinking the whole-chip IP by a ratio of the second scale to the first scale.

16. A method comprising:
providing a design of an integrated circuit at a first scale, wherein the integrated circuit comprises:
a shrinkable circuit comprising a first intellectual property (IP); and
a non-shrinkable circuit comprising a second IP having a hierarchical structure;
blowing up the second IP by a blow-up factor using a computer to generate a blown-up IP comprising:
blowing up contacts/vias in the second IP by the blow-up factor to generate blown-up contacts/vias;
recalculating new locations of the contacts/vias in the blown-up IP;
deleting the blown-up contacts/vias from the blown-up IP; and
redrawing the contacts/vias in the blown-up IP, with the redrawn contacts/vias having same sizes as the contacts/vias in the second IP.

17. The method of claim 16 further comprising integrating the blown-up IP with the first IP to generate a third IP, wherein contacts/vias of the shrinkable circuit in the third IP have same sizes as respective contacts/vias of the shrinkable circuit in the first IP.

18. The method of claim 17 further comprising optically shrinking the third IP to generate a lithography mask at a second scale, wherein a ratio of the first scale to the second scale equals the blow-up factor.

19. The method of claim 16, wherein the contacts/vias comprises contact plugs.

20. The method of claim 16, wherein the contacts/vias comprises vias.

* * * * *